United States Patent
Zhang et al.

(10) Patent No.: US 10,511,191 B2
(45) Date of Patent: Dec. 17, 2019

(54) APPARATUS AND METHODS FOR WIRELESS POWER TRANSMITTER COIL CONFIGURATION

(71) Applicant: QUALCOMM Incorporated, San Diego, CA (US)

(72) Inventors: Zhe Zhang, San Diego, CA (US); Jagadish Nadakuduti, La Jolla, CA (US); Lin Lu, San Diego, CA (US); Paul Guckian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 452 days.

(21) Appl. No.: 15/094,801

(22) Filed: Apr. 8, 2016

(65) Prior Publication Data

US 2017/0012475 A1 Jan. 12, 2017

Related U.S. Application Data

(60) Provisional application No. 62/190,641, filed on Jul. 9, 2015.

(51) Int. Cl.
*H02J 50/12* (2016.01)
*H02J 7/02* (2016.01)
(Continued)

(52) U.S. Cl.
CPC .............. *H02J 50/12* (2016.02); *H01F 38/14* (2013.01); *H02J 7/025* (2013.01); *H02J 50/10* (2016.02)

(58) Field of Classification Search
CPC . H02J 5/005; H02J 7/025; H02J 17/00; H04B 5/0025–0093; B60L 5/005;
(Continued)

(56) References Cited

U.S. PATENT DOCUMENTS

| 7,622,891 B2 | 11/2009 | Cheng et al. |
| 2005/0189910 A1* | 9/2005 | Hui ..................... H01F 17/0006 320/108 |

(Continued)

FOREIGN PATENT DOCUMENTS

| JP | 2008136311 A | 6/2008 |
| WO | WO-2013018268 A1 | 2/2013 |
| WO | WO-2015131870 A1 | 9/2015 |

OTHER PUBLICATIONS

International Search Report and Written Opinion—PCT/US2016/037800—ISA/EPO—dated Oct. 11, 2016.

*Primary Examiner* — Rexford N Barnie
*Assistant Examiner* — Thai H Tran
(74) *Attorney, Agent, or Firm* — Polsinelli LLP

(57) ABSTRACT

Methods and apparatus are disclosed for wirelessly transmitting power. In one aspect, an apparatus for wireless transmitting power is provided. The apparatus comprises a first coil loop defining a first area, the first coil loop conducting current at a first current value for generating a first magnetic field. The apparatus further comprises a second coil loop surrounding the first coil loop and defining a second area, the second coil loop conducting current at a second current value generating a second magnetic field, wherein a ratio of the first current value to the first area is substantially equal to a ratio of the second current value to the second area.

27 Claims, 4 Drawing Sheets

(51) Int. Cl.
*H01F 38/14* (2006.01)
*H02J 50/10* (2016.01)

(58) Field of Classification Search
CPC ...... B60L 11/182; B60L 11/1829–1831; Y02T 90/122; H01F 27/006; H01F 27/02; H01F 38/14; H01F 2038/143–146; H01R 13/6633; A61N 1/3787; A61B 1/00029
USPC .......................................... 307/104; 320/108
See application file for complete search history.

(56) References Cited

U.S. PATENT DOCUMENTS

| | | | |
|---|---|---|---|
| 2008/0150693 A1* | 6/2008 | You | G06K 7/0008 340/10.1 |
| 2009/0102419 A1* | 4/2009 | Gwon | H02J 7/025 320/108 |
| 2010/0181843 A1 | 7/2010 | Schatz et al. | |
| 2012/0169279 A1* | 7/2012 | Kim | H02J 7/025 320/108 |
| 2013/0069445 A1* | 3/2013 | Waffenschmidt | H01F 27/2804 307/104 |
| 2013/0154383 A1 | 6/2013 | Kasturi et al. | |
| 2015/0054348 A1 | 2/2015 | Akiya | |
| 2015/0115723 A1 | 4/2015 | Levo et al. | |
| 2015/0170830 A1 | 6/2015 | Miyamoto | |
| 2015/0244178 A1* | 8/2015 | Tang | A61N 1/3787 307/104 |
| 2015/0255987 A1* | 9/2015 | Yang | H01F 27/28 307/104 |

* cited by examiner

APPARATUS AND METHODS FOR WIRELESS POWER TRANSMITTER COIL CONFIGURATION

CROSS REFERENCE TO RELATED APPLICATIONS

This application claims priority under 35 U.S.C. § 119(e) to U.S. Provisional Patent Application No. 62/190,641 entitled "APPARATUS AND METHODS FOR WIRELESS POWER TRANSMITTER COIL CONFIGURATION," filed on Jul. 9, 2015.

FIELD

The present disclosure relates generally to a configuration of a wireless power transmitter.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an apparatus for wirelessly transmitting power. The apparatus includes a first coil loop defining a first area, the first coil loop conducting current at a first current value for generating a first magnetic field. The apparatus further includes a second coil loop surrounding the first coil loop and defining a second area, the second coil loop conducting current at a second current value generating a second magnetic field, wherein a ratio of the first current value to the first area is substantially equal to a ratio of the second current value to the second area.

Another aspect of the subject matter described in the disclosure provides an implementation of a method of wirelessly transmitting power from a transmitter. The method generating a first magnetic field via a first coil loop. The first coil loop defines a first area and conducts current at a first current value. The method further includes generating a second magnetic field via a second coil loop. The second coil loop surrounds the first coil loop and defines a second area. The second coil loop further conducts current at a second current value, wherein a ratio of the first current value to the first area is substantially equal to a ratio of the second current value to the second area.

Another aspect of the subject matter described in the disclosure provides an apparatus for wirelessly transmitting power. The apparatus includes a first means for generating a first magnetic field wound about a point to define a first area. The first means for generating the first magnetic field conducts time-varying electrical current at a first current value. The apparatus further includes a second means for generating a second magnetic wound about the point to define a second area. The second means for conducting electrical current conducts time-varying electrical current at a second current value, wherein a ratio of the first current value to the first area is substantially equal to a ratio of the second current value to the second area.

Another aspect of the subject matter described in the disclosure provides an apparatus for wirelessly transmitting power. The apparatus includes a first coil loop defining a first area. The first coil loop conducts current having a first current value and generating a first magnetic field. The apparatus further includes a second coil loop separated from the first coil loop and defining a second area. The second coil loop conducts current having a second current value and generates a second magnetic field. The apparatus further includes at least one driver circuit configured to drive the first coil with a first current value and the second coil loop with a second current value. The first current value different from the second current value, wherein a ratio of the first current value to the first area is substantially equal to a ratio of the second current value to the second area.

Figure 1:
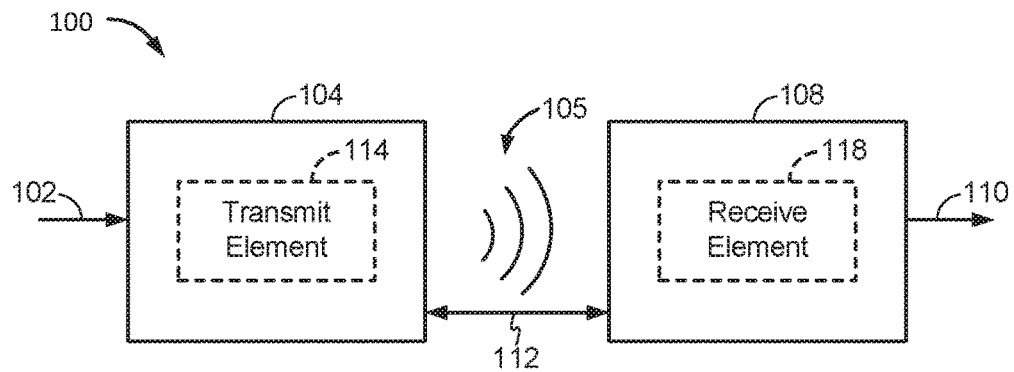
FIG. 1 is a functional block diagram of an exemplary wireless power transfer system, in accordance with exemplary embodiments.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104 as will be further described below. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
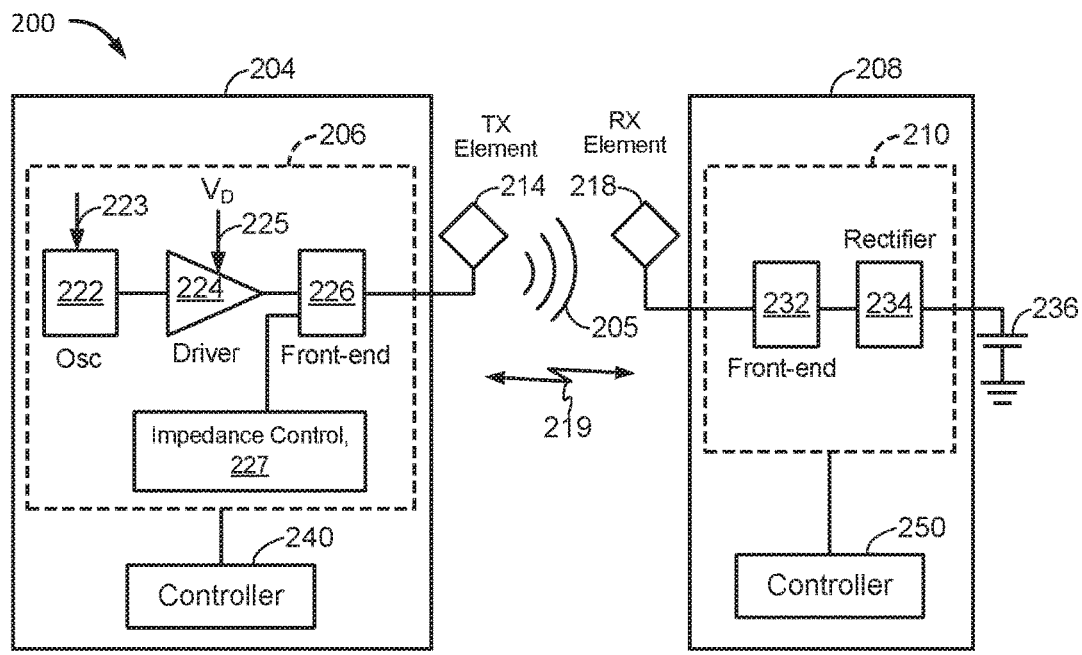
FIG. 2 is a functional block diagram of exemplary components that may be used in the wireless power transfer system of FIG. 1, in accordance with various exemplary embodiments.

FIG. 2 is a functional block diagram of a wireless power transfer system 200, in accordance with another illustrative embodiment. The system 200 may include a transmitter 204 and a receiver 208. The transmitter 204 (also referred to herein as power transmitting unit, PTU) may include transmit circuitry 206 that may include an oscillator 222, a driver circuit 224, a front-end circuit 226, and an impedance control module 227. The oscillator 222 may be configured to generate a signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit to filter out harmonics or other unwanted frequencies. The front-end circuit 226 may include a matching circuit to match the impedance of the transmitter 204 to the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load. The impedance control module 227 may control the front-end circuit 226.

The transmitter 204 may further include a controller 240 operably coupled to the transmit circuitry 206 configured to control one or aspects of the transmit circuitry 206 or accomplish other operations relevant to managing the transfer of power. The controller 240 may be a micro-controller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry to match the impedance of the receive circuitry 210 to the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. Transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter and the receiver.

Figure 3:
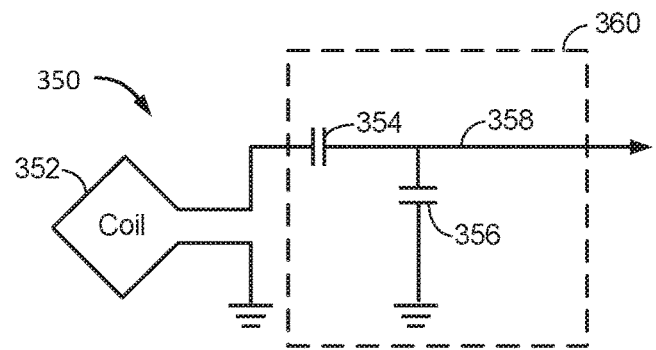
FIG. 3 is a schematic diagram of a portion of transmit circuitry or receive circuitry of FIG. 2 including a transmit or receive antenna, in accordance with exemplary embodiments.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another "antenna." The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356 may be added to the transmit and/or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Embodiments and descriptions provided herein may be applied to resonant and non-resonant implementations (e.g., resonant and non-resonant circuits for power transmitting or receiving elements and resonant and non-resonant systems).

Figure 4:
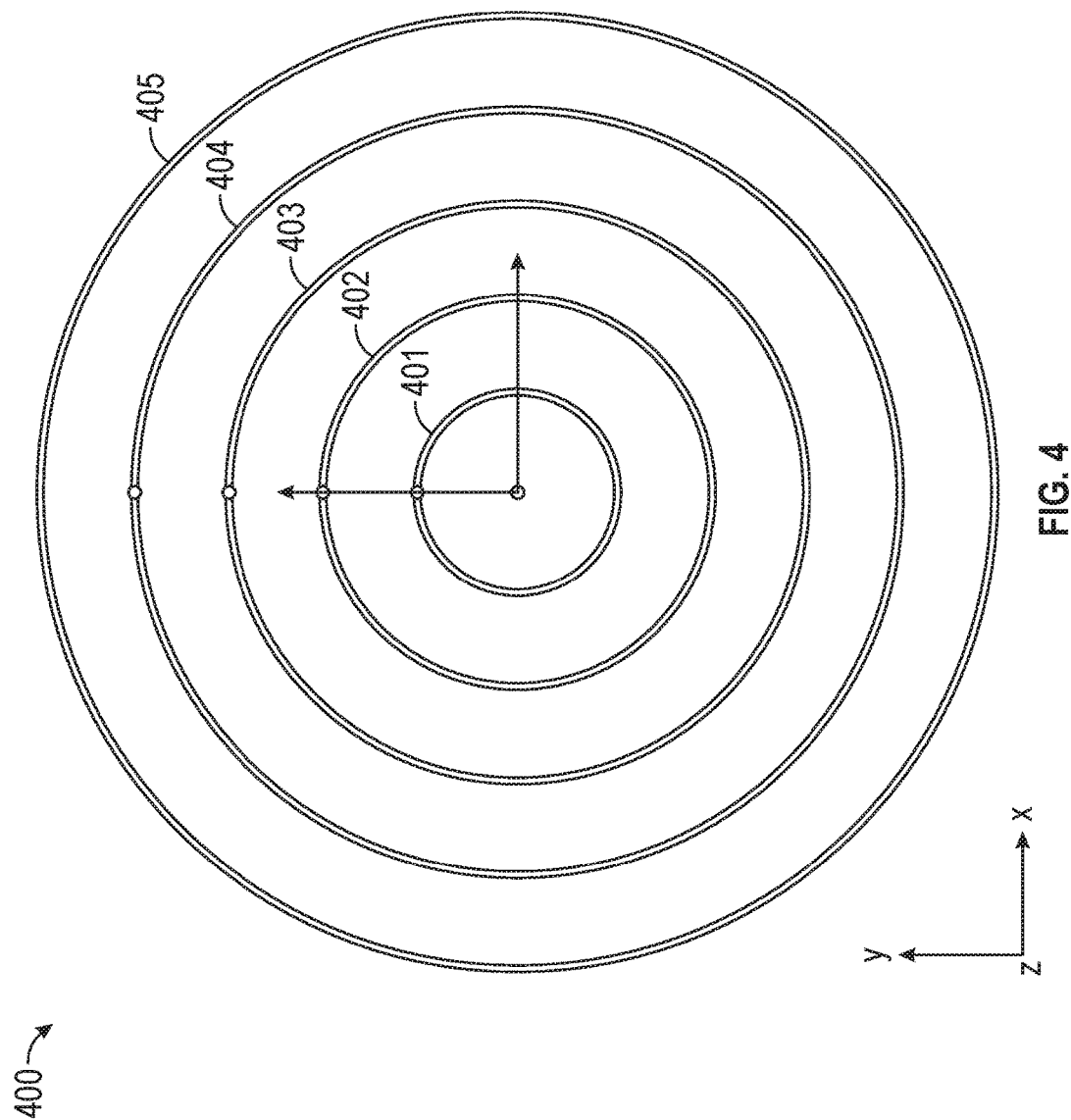
FIG. 4 is a diagram of an exemplary power transmitting element antenna/coil structure in accordance with an embodiment.

FIG. 4 is a diagram of an exemplary power transmitting element structure 400 that may provide a more uniform magnetic field in accordance with aspects of embodiments of the present disclosure. As shown, the power transmitting element structure 400 comprises five concentric coil loops: the inner-most or smallest coil loop 401, the next largest coil loop 402, the next largest coil loop 403, the next largest coil loop 404, and the outer-most or largest coil loop 405. The five coil loops 401-405 are exemplary and more or fewer coil loops are possible. The coil or coils used for coil loops 401-405 may include any conductive material (e.g., copper, silver, aluminum, etc.).

In some aspects, it may be desirable for the power transmitting element 400—also referred to as a transmitter resonator, transmitter antenna, or transmitter coil—of a particular design classification to generate a magnetic field that has uniform magnetic field distribution over its charging surface in order to get the substantially same charging efficiency irrespective of the power receiving unit (PRU) placement on the power transmitting element 400 or charging pad.

In some aspects, the coil loops 401-405 are configured such that the electrical current amplitude of each coil loop is proportional to the area of the coil loop. The strength of the magnetic field at the center point (or at any other point of the power transmitting element 400) is inversely proportional to the distance from the coil and the current running through the coil, resulting in a lower magnetic field at the center point. In order to obtain uniform magnetic field distribution over the area covered by the outer-most coil 405, several concentric coil loops 404-401 with decreasing radius and decreasing current amplitudes have been placed to strengthen the magnetic field in the inner regions (including the center point). The current amplitudes of the coil loops 401-405 are chosen to be proportional to the coil loop areas in order to achieve high uniformity in magnetic field distribution above the coil surface (i.e., charging pad). In some aspects, the current amplitude may be calculated as a peak value of an alternating current or as a root-mean-square value of a current.

In some aspects of certain embodiments, in order to achieve a current amplitude in each coil loop that is proportional to the area of the coil, each coil loop may be coupled to a separate current source (as shown and described below with respect to FIG. 6). Each of the separate current sources may be configured to provide a current amplitude in the coil loop that is proportional to the area of the coil. In some aspects, a current source may comprise a driver circuit (e.g., driver circuit 224) configured to drive a current and/or voltage through a coil. That is, $I_C=kA_C$, where $I_C$ is the current for the coil loop, k is a proportionality constant, and $A_C$ is the area for the coil loop. In some aspects, proportionality constant k may be any positive number. For example, the current sources for coil loops 401 and 402 may provide a current at a value such that $I_{C1}/A_1=I_{C2}/A_2$, where $I_{C1}$ is the current in coil loop 401, $I_{C2}$ is the current in coil loop 402, $A_1$ is the area of coil loop 401, and $A_2$ is the area of coil loop 402.

In one aspect for one non-liming example and for purposes of illustration, coil loop 401 may have a radius of 0.2 meters (m), coil loop 402 may comprise a radius of 0.4 m, coil loop 403 may comprise a radius of 0.6 m, coil loop 404 may comprise a radius of 0.8 m, and coil loop 405 may comprise a radius of 1 m. In one geometric arrangement of the coil loops 401-405, such as described above, the distance between each of the coil loops is the same (i.e., 0.2 m). Accordingly, the ratio of the radius for each coil loop to the radius of the outer coil loop 405 would be $(r_1/r_5)$ for coil loop 401, $(r_2/r_5)$ for coil loop 402, $(r_3/r_5)$ for coil loop 403, $(r_4/r_5)$ for coil loop 404, and $(r_5/r_5)$ for coil loop 405, where $r_1, r_2, r_3, r_4, r_5$, are the radius for the coil loops 401, 402, 403, 404, and 405, respectively. For the example above, the ratio of the radii for the coil loops 401-405 is 0.2:0.4:0.6:0.8:1.0 or 1:2:3:4:5. The area of a circle is given by the equation $A=\pi r^2$, where A is the area and r is the radius of the circle. The area covered by the coil loops 401-405 then equals $\pi(0.2)_2, \pi(0.4)^2, \pi(0.6)^2, \pi(0.8)^2, \pi(1)^2$, respectively. Therefore, the ratio of the area of the coil loops 401-405 to the area of coil loop 401 is $A_1/A_1$ for coil loop 401, $A_2/A_1$ for coil loop 402, $A_3/A_1$ for coil loop 403, $A_4/A_1$ for coil loop 404, and $A_5/A_1$ for coil loop 405, where $A_3, A_4, A_5$ are the areas for coil loops 403, 404, and 405, respectively. For the example above, $[\pi(0.2)^2/\pi(0.2)^2]:[\pi(0.4)^2/\pi(0.2)^2]:[\pi(0.6)^2/\pi(0.2)^2]:[\pi(0.8)^2/\pi(0.2)^2]:[\pi(1)^2/\pi(0.2)^2]$ or 1:4:9:16:25. Stated another way, the area for each of the coil loops 401-405 would be $A_1$ for coil loop 401, $4*(A_1)$ for coil loop 402, $9*(A_1)$ for coil loop 403, $16*(A_1)$ for coil loop 404, and $25*(A_1)$ for coil loop 405.

For the geometric arrangement described above, and to maintain proportionality of the current in each coil loop to the area of each of the coil loops 401-405, the current in each of the coil loops 401-405 would be $I_{C1}$ for coil loop 401, $4*(I_{C1})$ for coil loop 402, $9*(I_{C1})$ for coil loop 403, $16*(I_{C1})$ for coil loop 404, and $25*(I_{C1})$ for coil loop 405. Accordingly, the current sources for coil loops 401-405 may be configured to provide a current at a value proportional to the area of the coil loops 401-405, $I_C=kA_C$. For the example above, assuming the proportionality constant k equals 1, the current source of coil loop 401 would provide a current of substantially $\pi(0.2)^2$ amperes, the current source of coil loop 402 would provide a current of substantially $\pi(0.4)^2$ amperes, the current source of coil loop 403 would provide a current of substantially $\pi(0.6)^2$ amperes, the current source of coil loop 404 would provide a current of substantially $\pi(0.8)^2$ amperes, and the current source of coil loop 405 would provide a current of substantially $\pi(1)^2$ amperes. Similar to the ratio of the area of the coil loops described above, the ratio of the current value in each of the coil loops 401-405 to the current value in the coil loop 401 would be $[\pi(0.2)^2/\pi(0.2)^2]$: $[\pi(0.4)^2/\pi(0.2)^2]:[\pi(0.6)^2/\pi(0.2)^2]:[\pi(0.8)^2/\pi(0.2)^2]:[\pi(1)^2/\pi(0.2)^2]$ or 1:4:9:16:25 for each coil from the inner coil loop 401 to the outer coil loop 405, respectively. In some embodiments, rather than using a separate current source for each of the coil loops 401-405, the power transmitting element structure 400 may comprise a capacitor network, or some other circuit structure, to adjust the current amplitude in each coil to achieve the same ratio.

In some embodiments, the power transmitting element structure 400 and/or each of the coil loops may be coupled to more or fewer current sources to provide a current at a current value or amplitude in each coil loop 401-405 that is proportional to the area of the coil loop. For example, in some aspects, the power transmitting element structure 400 may comprise a single coil winding where the coil loops 401-405 are formed from the single coil winding. In this embodiment, the single coil may be coupled to a single current source. While circular coil loops are shown, in certain embodiments, the coil loops 401-405 (and coil loops 501-503 described below) may have non-circular geometries (e.g., oval, semi-rectangular, etc.) but equivalent areas could be calculated and current values for the coil loops could be further determined for generating uniformity in the magnetic field in accordance with the principles described herein.

Figure 5:
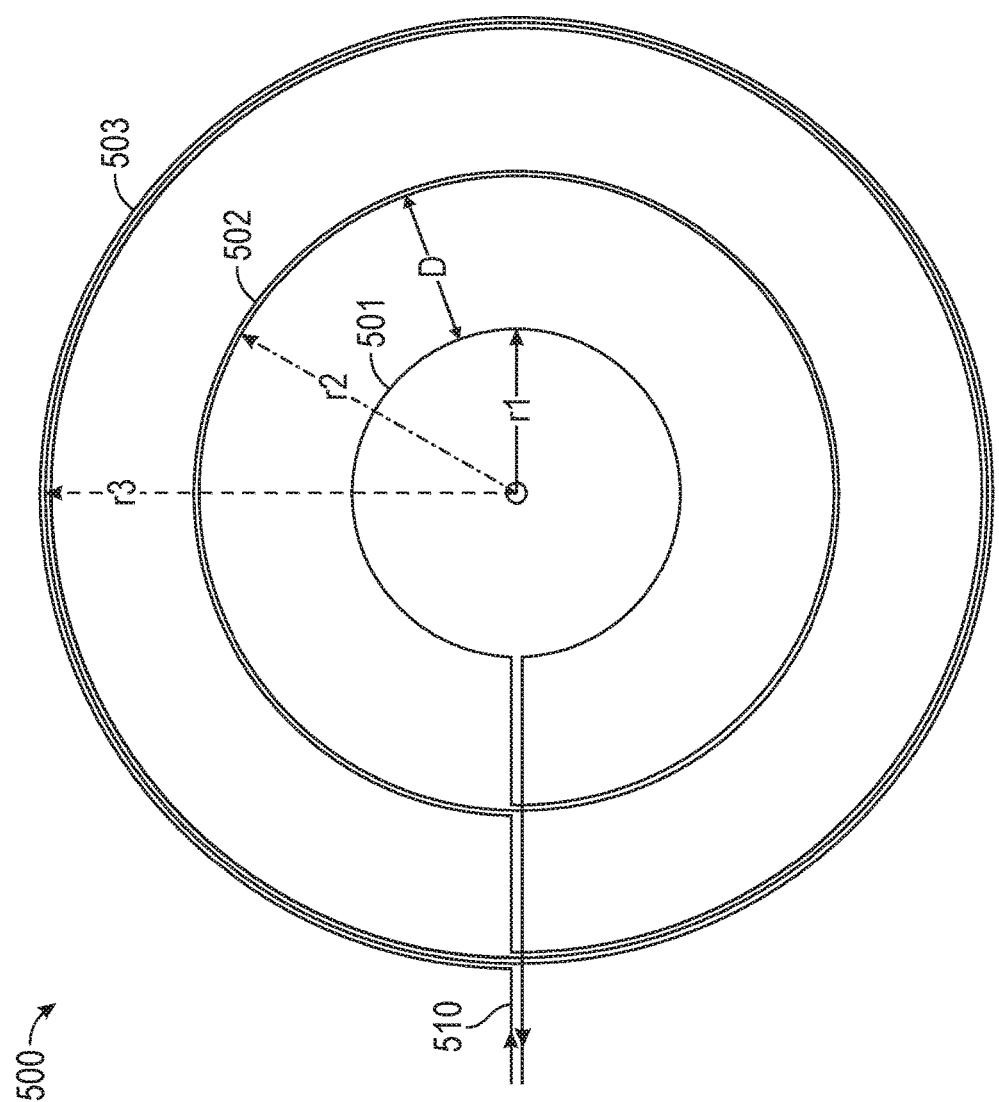
FIG. 5 is a diagram of another exemplary power transmitting element antenna/coil structure in accordance with an embodiment.

FIG. 5 is a diagram of another exemplary power transmitting element structure 500 that may provide a uniform magnetic field. As shown, power transmitting element structure 500 comprises three concentric coil loops, an inner coil loop 501, a middle coil loop 502, and an outer coil loop 503, and a current source 510 coupled to the coil loops 501-503. As shown, the coil loops 501-503 are formed from a single coil winding, coil loop 501 comprises a single turn with a radius $r_1$ and an area $A_1$, coil loop 502 comprises two turns with a radius $r_2$ and an area $A_2$, and coil loop 503 comprises three turns with a radius $r_3$ and an area $A_3$. That is, the number of turns in each of the coil loops 501-503 would be $N_1$ for coil loop 501, $2*(N_1)$ for coil loop 502, and $3*(N_1)$ for coil loop 503. In order to achieve a current amplitude in each coil loop that is proportional to the area of the coil, the number of turns in each of the coil loops 501-503 should be proportional to the area of the coil loop. That is, $N_C=kA_C$, where $N_C$ is the number of turns in a coil loop. For example, in one aspect, the coil loop 501 may have an area of 1 m$^2$, the coil loop 502 may have an area of 2 m$^2$, the coil loop 501 may have an area of 3 m$^2$. Additionally, the ratio of the area of the coil loops 501-503 to the area of the coil loop 501 is $A_1/A_1$ for coil loop 501, $A_2/A_1$ for coil loop 501, and $A_3/A_1$ for coil loop 501, or 1:2:3 for coil loops 501, 502, and 503, respectively. For the geometric arrangement shown in FIG. 5, the area for each of the coil loops 501-503 would be $A_1$ for coil loop 501, $2*(A_1)$ for coil loop 502, $3*(A_1)$ for coil loop 503. From the equation $I_C=kA_C$ above, $I_1/A_1=I_2/A_2=I_3/A_3=k$, where $I_1, I_2,$ and $I_3$ are the currents in the coil loops 501, 502, and 503, respectively. Similarly, from the equation $N_C=kA_C$ above, $N_1/A_1=N_2/A_2=N_3/A_3=k$, where $N_1, N_2,$ and $N_3$ are the number of turns in the coil loops 501, 502, and 503, respectively. Accordingly, solving for the current, and assuming the proportionality constant k equals 1, the current in each coil loop 501-503 would be 1 ampere for coil loop 501, 2 amperes for coil loop 502, and 3 amperes for coil loop 503, in order to maintain the proportional relationship.

In order to achieve the current values in each coil loop 501-503 from the single current source 510, the coil loops 501-503 may comprise multiple turns as shown. The current in a coil loop is directly proportional to the number of turns in the coil loop according to the equation $I_L=I_SN$, where $I_L$ is the current of the coil loop, $I_S$ is the current of the current source, and N is the number of turns. For example, if the current source 510 provides a current of 1 ampere, a coil loop of two turns would carry an equivalent current of 2 amperes, a coil loop of three turns would carry an equivalent current of 3 amperes, and so on. As shown in FIG. 5, the number of turns in each of the coil loops 501-503 is 1, 2, and 3, respectively, which is proportional to the area of the coil loops 501-503. That is, the ratio of the number of turns in each of the coil loops 501-503 to the number of turns in the coil loop 501 is $N_1/N_1$ for coil loop 501, $N_2/N_1$ for coil loop 502, and $N_3/N_1$ for coil loop 503. Accordingly, the ratio of the number of turns is 1:2:3 for coil loops 501, 502, and 503, respectively. Thus, the ratio of the number of turns in each of the coil loops 501-503 is proportional to the ratio of the area of each of the coil loops 501-503 such that $N_1/A_1=N_2/A_2=N_3/A_3$. In the above example, the number of turns and the area of the coil loops each have the 1:2:3 ratio, respectively. That is, a ratio of the number of turns in the coil loop 501 to the area of the coil loop 501 is substantially equal to a ratio of the number of turns in the coil loop 502 to the area of the coil loop 502, and is substantially equal to the same ratio for the coil loop 503.

Likewise, current amplitude for the coil loops 501-503 is proportional to the area of the coil loops 501-503 ($A_1$-$A_3$), as shown above in the equation $I_C=kA_C$. In the example above, since the current source 510 is providing a current of a value of 1 ampere, the current in coil loop 501 would be 1 ampere, the current in coil loop 502 would be 2 amperes, and the current in coil loop 503 would be 3 amperes. Accordingly, the ratio of the current amplitude for the coil loops 501-503 is 1:2:3, which is proportional to both the area of the coil loops 501-503 and to the number of turns in each of the coil loop 501-503. This configuration facilitates generating a substantially uniform magnetic field across the power transmitting element structure 500.

Similarly, in some embodiments, in order to achieve a uniform magnetic field distribution, the power transmitting element structure 500 may be configured such that the number of turns in each coil loop 501-503 is proportional to the current amplitude in the coil loop. For example, $N_C=kI_C$. In the embodiment described above, since the ratio of the current amplitude for each coil loop is 1:2:3 from the inner coil loop 501 to the outer coil loop 503, the ratio of the number of turns in each coil loop will be 1:2:3 times the number of turns of the coil loop 501. That is, a ratio of the number of turns in the coil loop 501 to the current amplitude in the coil loop 501 is substantially equal to a ratio of the number of turns in the coil loops 502 to the current amplitude in the coil loop 502, and is substantially equal to the same ratio for the coil loop 503. Stated another way $N_1/I_1=N_2/I_2=N_3/I_3$.

Moreover, a distance between the coil loops 501-503 may be defined by the area of the coil loop, the number of turns of the coil loop or the current amplitude since each has a proportional relationship with the other. For example, since the area of the coil loop 501 to the area of the coil loop 502 is 1:2, the relationship between the radii of the coil loop 501 and coil loop 502 is $2\pi r_1^2=\pi r_2^2$. Which results in $r_2=(\sqrt{2})r_1$. The distance, D, between $r_1$ and $r_2$ is then $r_2-r_1=(\sqrt{2})r_1-r_1$. Which results in $(\sqrt{2})-1$ or 0.414 m. Using a similar calculation, the distance between $r_1$ and $r_3$ is then $r_3-r_1=(\sqrt{3})r_1-r_1$ or 0.732 m.

Figure 6:
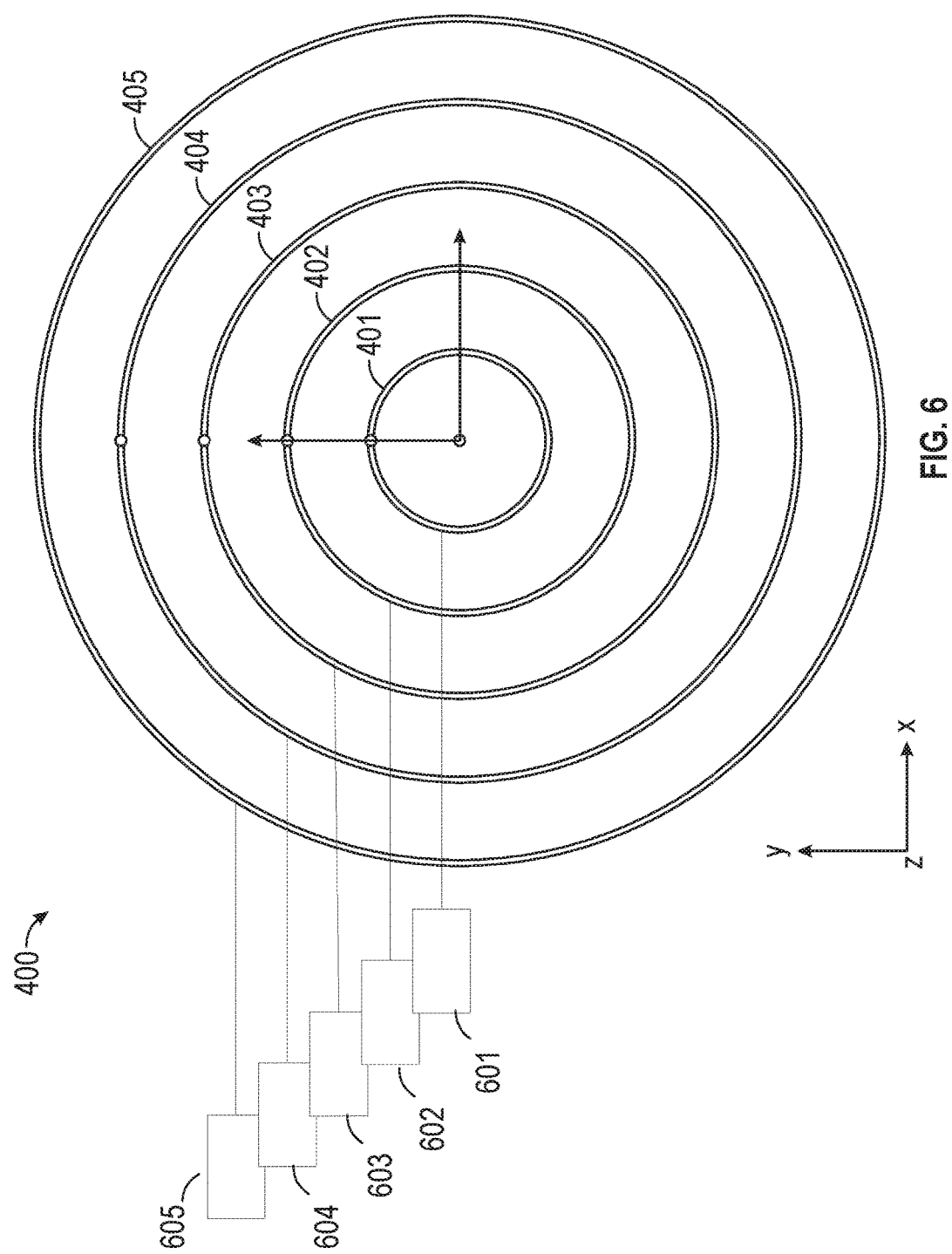
FIG. 6 is a diagram of another exemplary power transmitting element antenna/coil structure in accordance with an embodiment.

FIG. 6 is a diagram of an exemplary power transmitting element structure 600 that may provide a more uniform magnetic field in accordance with aspects of embodiments of the present disclosure. The power transmitting element structure 600 is similar to and adapted from the power transmitting element structure 400 of FIG. 4. Only differences between the power transmitting element structures 400 and 600 are described for the sake of brevity.

As shown in FIG. 6, the power transmitting element structure 600 comprises separate current sources 601, 602, 603, 604, and 605 for each of the coil loops 401, 402, 403, 404, and 405, respectively. In some aspects, the current sources 601, 602, 603, 604, and 605 may comprise any circuit configured to drive or output a current into the coil loops 401-405. As described above with respect to FIG. 4, each of current sources 601, 602, 603, 604, and 605 may be configured to drive a current in their respective coil loop such that the current is proportional to the area of the coil.

In some aspects, the power transmitting element structures 400, 500, and 600 provide a non-limiting benefit of a more uniform magnetic field distribution which increases efficiency and reduces the need for power receiving units with more complex circuitry to withstand high variances in applied voltages or to design power receiving units which averages the peaks and valleys of a magnetic field of the power transmitting element. For example, other power transmitting element structures that do not have good uniformity, may restrict the charging area and charging efficiency for the power transmitting element or coil. In some aspects, transmitting element structures can employ smaller coils in a M×N two dimensional matrix to increase the charging area, but this structure may result in weak charging zones on the charging surface where the efficiency is low when power receiving units are placed in those locations. In these aspects, there may be several spots on the power transmitting element where the field is much greater or much lower than the nominal field strength. This in turn may force a power receiving element 318 (FIG. 3) designer to either build the receive circuitry of the power receiving element 350 (FIG. 3) to withstand high variances in applied voltages or to design the power receiving element (e.g., antenna/coil configuration in combination with circuitry to create a resonate circuit) which averages the peaks and valleys of a magnetic field of the power transmitting element.

In some embodiments, the proportionality of the current amplitude in a coil loop to the area of the coil loop and the proportionality of the number of turns in a coil loop to the area of the coil loop described herein may provide a more uniform magnetic field distribution than other power transmitting element designs using the same number of coil loops but not having the proportionality described herein.

For example, in testing the uniformity of magnetic fields of a surface of a power transmitting element over various power transmitting element antenna/coil structure configurations, an optimal configuration included coil loops with a proportional relationship between the area of the coil loop and the current amplitude as described above. For one particular power transmitting element configuration with the coil structure having a proportional relationship between the area of the coil loop and the current amplitude, the power transmitting element configuration achieved up to a 6 decibel (dB) uniformity in the normal component of magnetic field over 64% of the surface of the power transmitting element at a height of one-fifth of outer coil radius. Other power transmitting element configurations not using the proportional relationship between the coil loop area and current amplitude or number of turns achieved less than 50% uniformity in the normal component of magnetic fields at the same height above the surface of the power transmitting element. In other aspects, the power transmitting element configurations described herein may provide greater variability of design dimensions to allow higher resolution of design tweaking. For example, while circular coil loops are shown herein, other coil shapes are possible.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wirelessly transmitting power, the apparatus comprising:
a first coil loop defining a first area, the first coil loop conducting current having a first current value that is proportional to the first area and generating a first magnetic field, wherein the first coil loop includes a first number of turns, the first number of turns being proportional to the first area defined by the first coil loop to achieve the first current value that is proportional to the first area; and
a second coil loop surrounding the first coil loop and defining a second area, the second coil loop conducting current having a second current value that is proportional to the second area and generating a second magnetic field, wherein the second coil loop includes a second number of turns, the second number of turns being proportional to the second area defined by the second coil loop to achieve the second current value that is proportional to the second area, wherein a ratio of the first current value to the first area is equal to a ratio of the second current value to the second area, wherein the second current value is an integer multiple of the first current value, and wherein the second area is an integer multiple of the first area.

2. The apparatus of claim 1, wherein the second area is larger than the first area and the second current value is greater than the first current value.

3. The apparatus of claim 1, wherein the second number of turns of the second coil loop comprise two or more turns, and wherein a ratio of the first number of turns of the first coil loop to the first area is equal to a ratio of the two or more turns of the second coil loop to the second area.

4. The apparatus of claim 3, wherein the first coil loop and the second coil loop comprise a single winding of a conductive material coupled to a current source.

5. The apparatus of claim 1, wherein the first number of turns of the first coil loop comprise one or more turns and the second number of turns of the second coil loop comprise two or more turns, and wherein each turn in the second coil loop is conducting current having a current value substantially equal to a current value in each turn in the first coil loop.

6. The apparatus of claim 1, wherein the second number of turns of the second coil loop comprise two or more turns, and wherein a ratio of the first number of turns of the first coil loop to the first current value is equal to a ratio of the two or more turns of the second coil loop to the second current value.

7. The apparatus of claim 1, wherein the first coil loop and the second coil loop are coupled to a common current source.

8. The apparatus of claim 1, wherein a ratio of the first current value to the second current value is equal to a ratio of the first number of turns in the first coil loop to the second number of turns in the second coil loop.

9. The apparatus of claim 1, wherein the second area is larger than the first area and wherein the first magnetic field and the second magnetic field are configured to produce a combined magnetic field distribution having up to a 6 decibel (dB) uniformity in a normal component of the first and second magnetic fields over approximately 64% of the second area at a height above the second area.

10. A method of transmitting wireless power, comprising:
generating a first magnetic field via a first coil loop, the first coil loop defining a first area and conducting current at a first current value that is proportional to the first area, wherein the first coil loop includes a first number of turns, the first number of turns being proportional to the first area defined by the first coil loop to achieve the first current value that is proportional to the first area; and
generating a second magnetic field via a second coil loop, the second coil loop surrounding the first coil loop and defining a second area, the second coil loop conducting current at a second current value that is proportional to the second area, wherein the second coil loop includes a second number of turns, the second number of turns being proportional to the second area defined by the second coil loop to achieve the second current value that is proportional to the second area, wherein a ratio of the first current value to the first area is equal to a ratio of the second current value to the second area, wherein the second current value is an integer multiple of the first current value and wherein the second area is an integer multiple of the first area.

11. The method of claim 10, wherein the second area is larger than the first area and the second current value is greater than the first current value.

12. The method of claim 10, wherein the second number of turns of the second coil loop comprise two or more turns, and wherein a ratio of the first number of turns of the first coil loop to the first area is equal to a ratio of the two or more turns of the second coil loop to the second area.

13. The method of claim 12, wherein the first coil loop and the second coil loop comprise a single winding of a conductive material coupled to a current source.

14. The method of claim 10, wherein the first number of turns of the first coil loop comprise one or more turns and the second number of turns of the second coil loop comprise two or more turns, and wherein each turn in the second coil loop is conducting current having a current value substantially equal to a current value in each turn in the first coil loop.

15. The method of claim 10, wherein the second number of turns of the second coil loop comprise two or more turns, and wherein a ratio of the first number of turns of the first coil loop to the first current value is equal to a ratio of the two or more turns of the second coil loop to the second current value.

16. The method of claim 10, further comprising driving the first coil loop and the second coil loop with the first and second current values from a common current source.

17. The method of claim 10, wherein a ratio of the first current value to the second current value is equal to a ratio of the first number of turns in the first coil loop to the second number of turns in the second coil loop.

18. An apparatus for wirelessly transmitting power, the apparatus comprising:
a first means for generating a first magnetic field wound about a point to define a first area, the first means for generating the first magnetic field conducting time-varying electrical current at a first current value that is proportional to the first area, wherein the first means generating the first magnetic field includes a first number of turns, the first number of turns being proportional to the first area to achieve the first current value that is proportional to the first area; and
a second means for generating a second magnetic field wound about the point to define a second area, the second means for generating the second magnetic field conducting time-varying electrical current at a second current value that is proportional to the second area, wherein the second means for generating the second magnetic field includes a second number of turns, the second number of turns being proportional to the second area to achieve the second current value that is proportional to the second area, wherein a ratio of the first current value to the first area is equal to a ratio of the second current value to the second area wherein the second current value is an integer multiple of the first current value, and wherein the second area is an integer multiple of the first area.

19. The apparatus of claim 18, wherein the second area is larger than the first area and the second current value is greater than the first current value.

20. The apparatus of claim 18, wherein the second number of turns of the second means comprise two or more turns, and wherein a ratio of the first number of turns of the first means to the first area is equal to a ratio of the two or more turns of the second means to the second area.

21. The apparatus of claim 20, wherein the first means and the second means comprise a single winding of a conductive material coupled to a current source.

22. The apparatus of claim 18, wherein the first means comprises one or more turns and the second means comprises two or more turns, and wherein each turn in the second means is conducting current having a current value substantially equal to a current value in each turn in the first means.

23. The apparatus of claim 18, wherein the second number of turns of the second means comprise two or more turns, and wherein a ratio of the first number of turns of the first means to the first current value is equal to a ratio of the two or more turns of the second means to the second current value.

24. The apparatus of claim 18, wherein the first means and the second means are coupled to a common current source.

25. The apparatus of claim 18, wherein a ratio of the first current value to the second current value is equal to a ratio of the first number of turns in the first means to the second number of turns in the second means.

26. An apparatus for wirelessly transmitting power, the apparatus comprising:

a first coil loop defining a first area, the first coil loop conducting current having a first current value that is proportional to the first area and generating a first magnetic field, wherein the first coil loop includes a first number of turns, the first number of turns being proportional to the first area defined by the first coil loop to achieve the first current value that is proportional to the first area; and a second coil loop separated from the first coil loop and defining a second area, the second coil loop conducting current having a second current value that is proportional to the second area and generating a second magnetic field, wherein the second coil loop includes a second number of turns, the second number of turns being proportional to the second area defined by the second coil loop to achieve the second current value that is proportional to the second area; and at least one driver circuit configured to drive the first coil loop and the second coil loop with a current to achieve the first current value and the second current value, wherein a ratio of the first current value to the first area is equal to a ratio of the second current value to the second area, wherein the second current value is an integer multiple of the first current value, and wherein the second area is an integer multiple of the first area.

27. The apparatus of claim 26, wherein the second number of turns of the second coil loop comprise two or more turns of a conductive material.

\* \* \* \* \*